United States Patent [19]

Vessey

[11] Patent Number: 4,706,801
[45] Date of Patent: Nov. 17, 1987

[54] CONVEYOR ROLLER WITH TORQUE OVERLOAD RELEASE MEANS

[75] Inventor: John R. Vessey, Linden, Mich.
[73] Assignee: Excel Corporation, Fenton, Mich.
[21] Appl. No.: 793,700
[22] Filed: Oct. 31, 1985
[51] Int. Cl.$^4$ ............................................. B65G 13/06
[52] U.S. Cl. ................................. 198/781; 198/789; 198/842; 464/46
[58] Field of Search ............... 198/781, 789, 842, 843, 198/780; 464/45, 46, 47; 403/290, 309, 313; 74/434; 474/903

[56] References Cited

U.S. PATENT DOCUMENTS

| Re. 4,288 | 3/1871 | Buckman | 403/290 X |
|---|---|---|---|
| 2,712,377 | 7/1955 | Eggleston | 198/789 |
| 2,857,750 | 10/1958 | Fox | 464/46 X |
| 3,287,935 | 11/1966 | Grunbaum | 464/46 X |
| 4,015,484 | 4/1977 | Taylor | 198/842 X |
| 4,263,789 | 4/1981 | Koepke et al. | 464/36 |
| 4,275,572 | 6/1981 | Holmes et al. | 464/34 |
| 4,286,441 | 9/1981 | Scheneman et al. | 464/36 |
| 4,293,065 | 10/1981 | Dyer et al. | 198/781 |
| 4,325,474 | 4/1982 | Rae | 198/781 |
| 4,366,899 | 1/1983 | Doro | 198/781 |
| 4,406,360 | 9/1983 | Smith et al. | 198/781 |
| 4,428,697 | 1/1984 | Ruland | 403/290 X |
| 4,505,381 | 3/1985 | Major | 198/781 |
| 4,508,212 | 4/1985 | Bolle et al. | 198/781 |
| 4,524,861 | 6/1985 | Matsushita | 198/781 |

FOREIGN PATENT DOCUMENTS

| 2450835 | 5/1976 | Fed. Rep. of Germany | 403/290 |
| 807243 | 1/1937 | France | 403/290 |

Primary Examiner—Joseph E. Valenza
Assistant Examiner—Jonathan D. Holmes
Attorney, Agent, or Firm—Gifford, Groh, VanOphem, Sheridan, Sprinkle and Dolgorukov

[57] ABSTRACT

A roller having a torque overload release mechanism for use with an accumulating roller conveyor system. A shaft is rotatably mounted to a frame for the conveyor system while a drive sprocket is rotatably mounted to one end of the shaft. A first friction pad is secured to the shaft and abuts against one end of the drive sprocket while a second friction pad is axially slidably mounted to the shaft and abuts against the other axial end of the drive sprocket. A nut variable compresses one or more belleville washers against the second friction pad to thereby drivingly connect the drive sprocket and shaft together and yet permit torque overload release when the torque between the shaft and the sprocket exceeds a predetermined but adjustable amount.

7 Claims, 6 Drawing Figures

CONVEYOR ROLLER WITH TORQUE OVERLOAD RELEASE MEANS

BACKGROUND OF THE INVENTION

I. Field of the Invention

The present invention relates generally to roller conveyors and, more particularly, to a roller with torque overload release means.

II. Description of the Prior Art

In a roller conveyor system, a plurality of rollers are rotatably mounted to a frame and, together, define a conveyor track upon which articles are conveyed. One or more of the rollers are rotatably driven so that the driven rollers engage and propel the articles from one end and to the other end of the conveyor track.

In the event of a jam of the articles on the conveyor track, it is highly desirable that the power driven rollers disengage or stop rotating in order to prevent damage to the articles and/or conveyor system which might otherwise occur. For this reason, there have been a number of previously known conveyor rollers with torque overload release clutches which enable the conveyor rollers to remain stationary when the torque between the conveyor roller and its drive means exceeds a predetermined amount. The previously known roller conveyor systems of this type are known as accumulating roller conveyor systems.

Many of the previously known torque limiting clutches for roller conveyors employ a helical spring which is variably compressed in order to create a frictional engagement between the drive means and the conveyor roller. The previously known clutches of this type, however, are relatively difficult to adjust in the field. Furthermore, in many cases, a different helical spring is required in order to obtain the desired torque drive between the conveyor drive means and the conveyor roller which requires replacement of the helical springs. Such replacement is not only time consuming and expensive, but in many cases the replacement springs are not readily available.

A still further disadvantage of the previously known conveyor roller is that the roller is of a fixed length and is designed for a particular load. In many situations, however, it is desirable to adjust the effective length of the roller conveyor in order to accommodate different types of articles.

SUMMARY OF THE PRESENT INVENTION

The present invention provides a conveyor roller with a torque overload or torque limiting clutch which overcomes all the above-mentioned disadvantages of the previously known devices.

In brief, the conveyor roller of the present invention comprises an elongated shaft which is rotatably mounted to the conveyor frame. A pair of conveyor rollers are axially adjustably secured to the shaft in order to accommodate different types and sizes of loads.

A disk-shaped friction pad is secured to the shaft adjacent one end so that the friction pad and shaft rotate in unison with each other. A drive sprocket, pulley or the like is then positioned over the shaft so that one axial end of the sprocket abuts against one axial end of the first friction pad.

A second friction pad is then positioned over the end of the shaft so that the second friction pad abuts against the opposite axial end of the drive sprocket and so that the drive sprocket is sandwiched between the friction pads. A spacer is then positioned over the shaft end so that the spacer abuts against the second friction pad.

Thereafter, at least one, and preferably several, belleville washers are positioned over the shaft end while a nut threadably engages the shaft end and abuts against the washers. Upon tightening of the nut, the nut compresses the washers and, in doing so, compresses the friction pads against the drive sprocket through a spacer.

Consequently, as the drive sprocket is rotatably driven by the conveyor drive means, the frictional engagement between the drive sprocket and the friction pads drivingly connects the sprocket and the conveyor shaft together thereby rotatably driving the conveyor rollers in the desired fashion. In the event that the torque between the drive shaft and the drive sprocket exceeds a predetermined amount as set by the compression of the belleville washer(s), the drive sprocket will continue to rotate inbetween the friction pads while the drive shaft and its attached roller remains stationary.

The amount of torque transmission between the drive sprocket and the shaft can be varied not only by variably compressing the belleville washers by tightening or loosening the nut, but also by changing the number and orientation of the belleville washers. As such, the torque overload release point for the conveyor roller can be easily, simply and accurately adjusted in the field.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
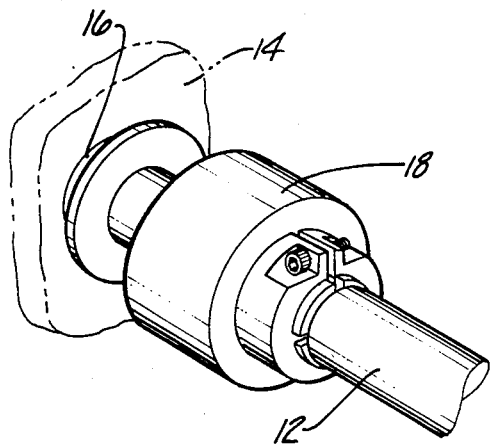
FIG. 1 is a perspective view illustrating a preferred embodiment of the present invention.

With reference first to FIG. 1, a preferred embodiment of the conveyor roller assembly 10 of the present invention is thereshown and comprises an elongated shaft 12 which is rotatably mounted to a conveyor frame 14 by conventional bearing assemblies 16. A pair of rollers 18 are mounted to the shaft 12 in a fashion to be subsequently described in greater detail and are adapted to engage a load or article on top of the rollers 18 and, upon rotation, propel the article along the conveyor track. A clutch assembly 20, which will be subsequently described in greater detail, drivingly connects the conveyor shaft 12 to a drive chain 22 which is continuously driven during normal operation of the conveyor system.

Figure 2:
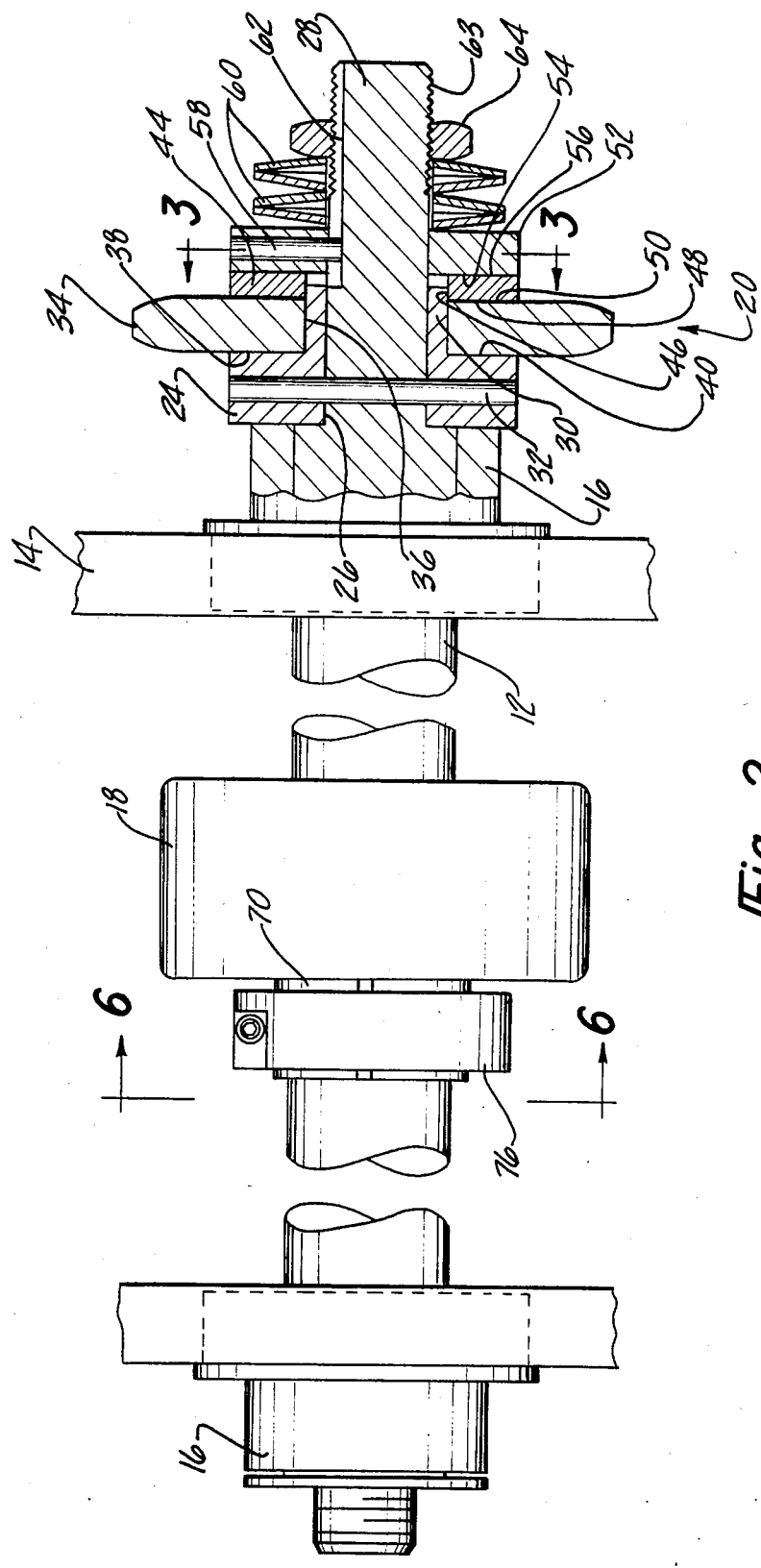
FIG. 2 is a fragmentary longitudinal sectional view of the preferred embodiment of the invention.

With reference now to FIG. 2, the clutch 20 is there-shown in greater detail and comprises a generally cylindrical first friction pad 24 having a throughbore 26. The friction pad throughbore 26 is positioned over one end 28 of the shaft 12 so that the friction pad 24 and shaft 12 are coaxial with each other. The friction pad 24 also includes an axially extending tubular and cylindrical flange 30 at its inner end and the friction pad 24 is secured against both rotation and axial movement to the shaft 12 by a roll pin 32.

A drive sprocket, pulley or the like (hereinafter called sprocket) 34 having a throughbore 36 is then positioned over the friction pad flange 30 so that one axial end 38 of the sprocket 34 abuts against one side 40 of the friction pad 24. Simultaneously, the sprocket throughbore 36 is positioned over and around the friction pad flange 30 so that the flange 30 acts as a bearing material between the sprocket 34 and the shaft 12 and prevents galling. The sprocket 34, however, can rotate and axially slide with respect to the friction pad 24 and thus with respect to the shaft 12.

Still referring to FIG. 2, the clutch assembly 20 further comprises a second disk-shaped friction pad 44 having a throughbore 46 which is positioned coaxially around the flange 30 on the first friction pad 24. In doing so, one side 48 of the second friction pad 44 abuts against the other axial end 50 of the sprocket 34 so that the axial ends 38 and 50 of the sprocket 34 are sandwiched between the sides 40 and 48 of the friction pads 24 and 44, respectively.

Figure 3:
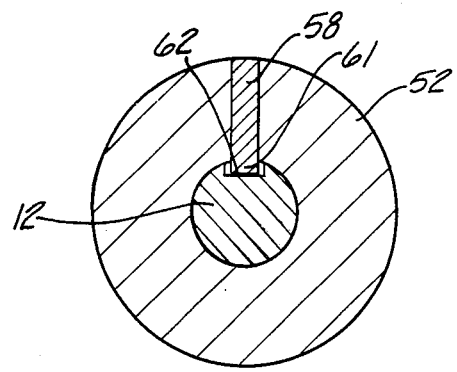
FIG. 3 is a cross-sectional view taken substantially along 3—3 in FIG. 2.

With reference now to FIGS. 2 and 3, a cylindrical spacer 52 is coaxially positioned over the shaft end 28 so that one side 54 of the spacer 52 abuts against the other side 56 of the second friction pad 44. A pin 58 attached to the spacer 52 has its inner end 61 positioned within an axially extending slot 62 on the shaft end 28. Thus, the pin 58 together with the slot 62 allows the spacer 52 to axially slide with respect to the shaft 12 but prevents rotation between the spacer 52 and shaft 12.

With reference still to FIG. 2, at least one and preferably a plurality of belleville washers 60 are coaxially positioned over the shaft end 28 so that the washers 60 abut against the spacer 52. The shaft end 28 is externally threaded as shown at 63 while a nut 64 threadably engages the threads 63 and abuts against the outermost belleville washer 60.

Figure 4:
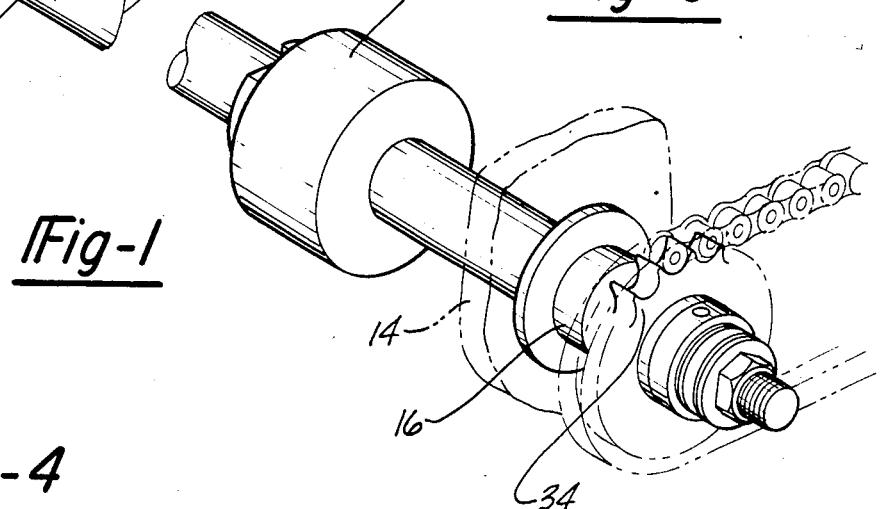
FIG. 4 is a view illustrating the clutch for the conveyor roller but with a different torque overload setting than illustrated in FIG. 2.
Figure 4:
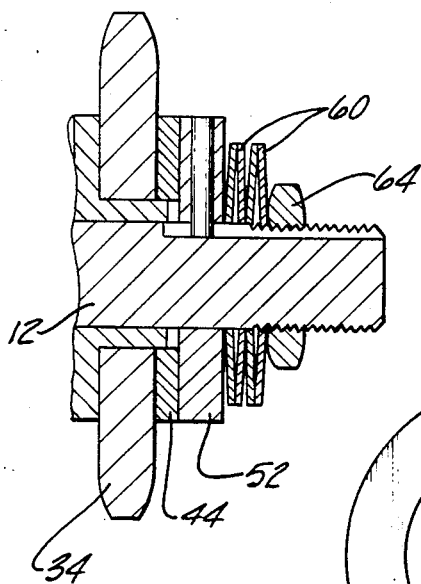

With reference now to FIG. 4, upon tightening of the nut 64, the nut 64 compresses the belleville washers 60 against the spacer 52. In doing so, the compressive force of the belleville washers 60 urges the friction pads 24 and 44 towards each other and thus compressibly against the axial ends 38 and 50 of the sprocket 34. This compressive force thus drivingly connects the sprocket 34 and shaft 12 together through the friction pad 24 and its roll pin 32 until the torque between the shaft 12 and sprocket 34 exceeds a predetermined amount. When this predetermined torque is reached or exceeded, the clutch 20 disengages so that the sprocket 34 continues to rotate while the shaft 12 remains stationary. Conversely, when the torque between the shaft 12 and sprocket 34 falls below the predetermined amount, for example when a jam condition on the conveyor line has ended, the clutch 20 reengages so that the sprocket 34 and shaft 12 again rotate in unison with each other. Furthermore, since both the spacer 52 and friction pad 24 are locked against rotation with respect to the shaft 12, an equal compressive force is applied to both sides of the sprocket 34.

The torque overload release point for the clutch 20 is adjustable by varying the position of the nut 64 on the shaft end 28 which, in turn, varies the compression of the belleville washer(s) 60. For example, as shown in FIG. 4 of the drawing the belleville washers 60 are in a more compressed state than illustrated in FIG. 2. When this occurs, the compression of the belleville washers 60, and thus the compressive force of the friction pads 24 and 44 against the drive sprocket 34 increases and the torque overload point for the clutch assembly 20 likewise increases, an vice versa.

Figure 5:
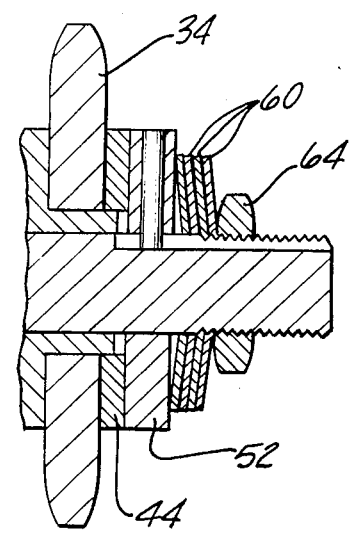
FIG. 5 is a view similar to FIG. 4 but illustrating a different arrangement of the belleville washers for the conveyor roller clutch.

The use of belleville washers 60 to vary the torque overload point for the clutch 20 is highly adavantageous in several different respects. First, the spring characteristics, and thus the compressive force applied between the sprocket 34 and friction pads 24 and 44, can be easily and simply varied in the field by adding and/or removing belleville washers 60 as required. Likewise, as shown in FIG. 5 of the drawing, the spring characteristics of the belleville washers 60 can be also altered by changing the orientation of the belleville washers 60 so that they lie on top of each other (FIG. 5) rather than facing each other (FIG. 4). Since the spring characteristics of the belleville washers 60 can be rapidly and easily varied, the conveyor roller 10 of the present invention can be adapted to a wide variety of different articles.

Figure 6:
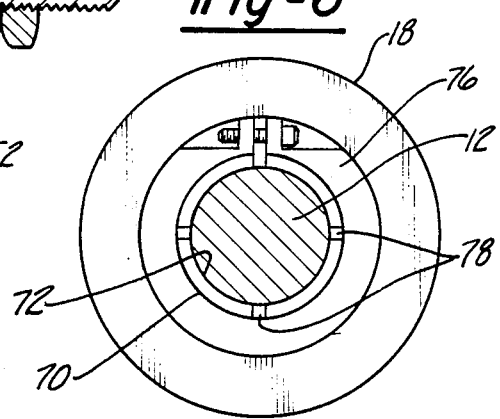
FIG. 6 is a sectional view taken substantially along line 6—6 in FIG. 2.

With reference now to FIGS. 2 and 6, each conveyor roller 18 preferably includes a ring 70 extending axially outwardly from its inner end having an inner periphery 72 in abutment with the outer periphery of the shaft 12. This ring 70 preferably includes a plurality of splits 78, best shown in FIG. 6. A clamp 76 is then positioned over the ring 70 so that, upon tightening, the clamp 76 compresses the ring 70 against the outer periphery of the shaft 12. Consequently, the axial position of each roller 18 along the shaft 12 can be easily varied by simply untightening the clamp 76, repositioning the roller 18, and then retightening the clamp 76 in the newly selected position. This feature of applicant's invention thus enables the conveyor roller assembly 10 to be easily adapted to accommodate different types of articles conveyed on the conveyor line.

From the foregoing, it can be seen that the conveyor roller assembly of the present invention provides a relatively inexpensive and yet highly effective conveyor roller with torque overload release means in which the torque overload release point can be easily and rapidly adjusted in the field.

Having described my invention, however, many modifications thereto will become apparent to those skilled in the art to which it pertains without deviation from the spirit of the invention as defined by the scope of the appended claims.

I claim:

1. A conveyor roller assembly for use with a conveyor having a frame comprising
  a shaft,
  means for rotatably mounting said shaft to the frame,
  a drive member having two axial ends and rotatably mounted to one end of said shaft,
  a first friction pad comprising a first disk and a tubular flange extending axially from an inner end of said first disk, said tubular flange having an outer durable surface upon which said drive member is rotatably mounted, and said first friction pad having a central axial throughbore receiving said shaft,
  means extending radially through said axial throughbore for securing said first friction pad to said shaft against axial and rotational movement with respect to said shaft, said first friction pad having an axial end adapted to flatly abut against a substantial portion of one axial end of said drive member, a second friction pad comprising a second disk having a circular axial throughbore dimensioned to fit over said tubular flange, so that a free end of said tubular flange is positioned within the throughbore of said second friction pad, and said second disk having a flat surface adapted to flatly abut against the other axial end of said drive member, said second disk being both rotatable and axially slidable with respect to said shaft, a spacer axially slidably mounted to said shaft, means for securing said spacer against rotation with respect to said shaft, so that one axial end of said spacer abuts against the other flat surface of said second friction pad, wherein said drive member is sandwiched between said first and second friction pads and is rotatably supported by said tubular flange, wherein said free end of said tubular flange terminates short of said spacer, and means for adjustably and resiliently urging said spacer towards said drive member.

2. The invention as defined in claim 1 wherein said urging means comprises at least one belleville washer and means for variably compressing said washer.

3. The invention as defined in claim 2 and comprising at least two belleville washers.

4. The invention as defined in claim 1 wherein said urging means further comprises a nut threadably mounted to said one end of said shaft so that said nut abuts against said spacer.

5. The invention as defined in claim 1 and comprising means to lock said spacer against rotational movement with respect to said shaft.

6. The invention as defined in claim 1 wherein said conveyor roller assembly comprises at least two rollers and means for axially adjustably securing said rollers against rotation to said shaft.

7. The invention as defined in claim 6 wherein each roller comprises a split ring having an inner periphery adjacent said shaft and wherein said roller securing means comprises a clamp for compressing said split ring inner periphery against said shaft.

* * * * *